United States Patent [19]

Hammond

[11] 4,095,916
[45] Jun. 20, 1978

[54] TIMED INTERMITTENT AIR PROPELLED LIQUID COOLANT SYSTEM FOR MACHINE TOOLS

[75] Inventor: Earl J. Hammond, Frankenmuth, Mich.

[73] Assignee: Houdaille Industries, Inc., Buffalo, N.Y.

[21] Appl. No.: 795,709

[22] Filed: May 11, 1977

[51] Int. Cl.² ............... B23B 35/00; B23B 51/06; B23B 3/00
[52] U.S. Cl. ............... 408/1 R; 82/1 C; 90/11 A; 407/11; 408/59; 408/61
[58] Field of Search ............ 408/56, 57, 59, 60, 408/61, 1; 407/11; 90/11 R; 82/1, 1 C, 34

[56] References Cited
U.S. PATENT DOCUMENTS

| | | | |
|---|---|---|---|
| 294,092 | 2/1884 | Sperry | 408/61 |
| 355,757 | 1/1887 | Crothers | 408/61 |
| 1,422,031 | 7/1922 | Caulkins | 408/61 |
| 2,437,605 | 3/1948 | Karge | 408/61 |
| 2,653,517 | 9/1953 | Pigott | 90/11 R |
| 3,333,489 | 8/1967 | Mossberg | 408/60 |
| 3,605,551 | 9/1971 | Steward | 407/11 |

*Primary Examiner*—Harrison L. Hinson
*Attorney, Agent, or Firm*—Hill, Gross, Simpson, Van Santen, Steadman, Chiara & Simpson

[57] ABSTRACT

Liquid coolant and lubricant is intermittently pressure fed through a hollow drill stem to the tip of a drill, preferably a spade drill, against the workpiece by compressed air from the conventional machine shop air line which is fed over and released from a column of the liquid coolant and lubricant at selected frequencies and for selected durations without the use of motors, pumps, or other propelling devices. A pair of manually adjusted controls select the frequency of intermittent coolant feed and the length of feed duration within the selected frequency to maintain desired operating temperatures at the drill tip while effectively flushing out chips cut from the workpiece.

26 Claims, 20 Drawing Figures

TIMED INTERMITTENT AIR PROPELLED LIQUID COOLANT SYSTEM FOR MACHINE TOOLS

FIELD OF THE INVENTION

This invention relates to the art of cooling and lubricating machine tools and particularly deals with the intermittent pressure feeding of a coolant liquid to the work engaging tip end of a drill at selectively adjusted timed intervals and for selectively adjusted durations to best suit operating conditions and flushing of chips.

THE PRIOR ART

Pumps for supplying coolant to a drill tip at varying pressures to pulse the coolant are known, for example, in the Borman U.S. Reissue Pat. No. 26,975, granted Oct. 27, 1970. Air line lubricators introducing oil into an air stream for lubricating machine parts and tools are also known in the art as for example in the Lansky et al U.S. Pat. No. 3,076,625, granted Feb. 5, 1963; the Boelkins U.S. Pat. No. 3,618,709, granted Nov. 9, 1971 and the Iizumi U.S. Pat. No. 3,756,348, granted Sept. 4, 1973. In the art line lubricator systems, lubricant reservoirs are maintained under pressure and flow therefrom is controlled by valves. Recirculation of the lubricant back to the pressure container is not provided, and if attempted, would require pumps to overcome the back pressure in the reservoirs.

SUMMARY OF THE INVENTION

This invention now eliminates the use of motors, pumps and the like wearable power means to circulate coolant through machine tools and uses the conventional machine shop compressed air source to propel liquid coolant through the machine tool. Compressed air from the source is intermittently fed over and released from a column of the liquid coolant at frequencies and for durations which are accurately selected by easily manipulated control means.

The column of liquid coolant is automatically replenished with coolant from the machine tool during that portion of the operating cycle where the compressed air is released from the column. The coolant supply line from the column to the machine tool is free from valves thus eliminating clogging problems. A simple flap-type check valve admits the recirculating coolant to the bottom of the column and prevents back flow during that portion of the cycle where the column is subjected to air pressure. A single air valve introduces the compressed air to the top of the column and exhausts the air to the atmosphere under control of a fluidics oscillator or clock which is manually set at a desired frequency and a fluidics oscillator or vibrator which is manually set to control the duration of the air pressure on the column of coolant within the set frequency. All of the controls are air operated. The manual setting devices are simple manually shifted needle valves preferably of the screw type which are easily rotated from manually grasped dials or heads.

The column of liquid coolant is conveniently housed in a relatively small cylindrical container which need only hold from about 1 quart to about 5 gallons of coolant since the coolant is replenished between the intermittent feed cycles. The head of the container houses the valve and the valve control devices. The bottom of the container has the coolant inlet and outlet and mounts a flap-type check valve over the inlet to prevent back flow. Thus, the unit is portable, can be mounted on the floor adjacent the coolant sump of a machine tool to receive coolant by gravity flow therefrom and can have hose connections with the compressed air line and with the machine tool.

The system of this invention is especially useful for pressure feeding of liquid coolant through a rotary coupling to the stem of a drill which flows the coolant over both side faces of a spade-type drill tip or head into the hole being drilled to cool the drill and effectively flush chips from the hole being drilled.

It is then an object of this invention to provide a coolant system for machine tools which feeds liquid coolant under pressure to the work engaging portion of the tool at a selected frequency for a selected duration without the aid of motors, pumps, and other wearable and power consuming coolant propelling devices.

Another object of this invention is to provide a simplified coolant system for drills using compressed air from a conventional machine shop source over a column of coolant to propel the coolant through the drill into the hole being drilled and having manually adjusted controls to sequentially apply and release the compressed air to the top of the column at a selected frequency and for a selected duration within the frequency.

Another object of the invention is to provide a spade drill coolant system which intermittently supplies liquid coolant under pressure at a selected frequency and for a selected duration within the frequency to the drill tip and into the hole being drilled.

A specific object of the invention is to provide a coolant system for rotary drills which houses a small column of liquid coolant receiving compressed air thereover at selected intervals controlled by a fluidics oscillator or clock and remaining at atmospheric pressure between said intervals for durations controlled by a fluidics vibrator to receive coolant from the drill at atmospheric pressure and to propel the coolant from the column to the drill under compressed air pressure.

Another specific object of the invention is to provide a drill coolant system which feeds liquid coolant under pressure through a drill into the hole being drilled at selected frequencies and for selected durations within the selected frequency without the aid of pumps.

Other and further objects of this invention will become apparent to those skilled in this art from the following detailed description of the annexed sheets of drawings which, by way of a preferred example only, illustrate one embodiment of the invention.

AS SHOWN ON THE DRAWINGS

Figures 1, 2, 2A:
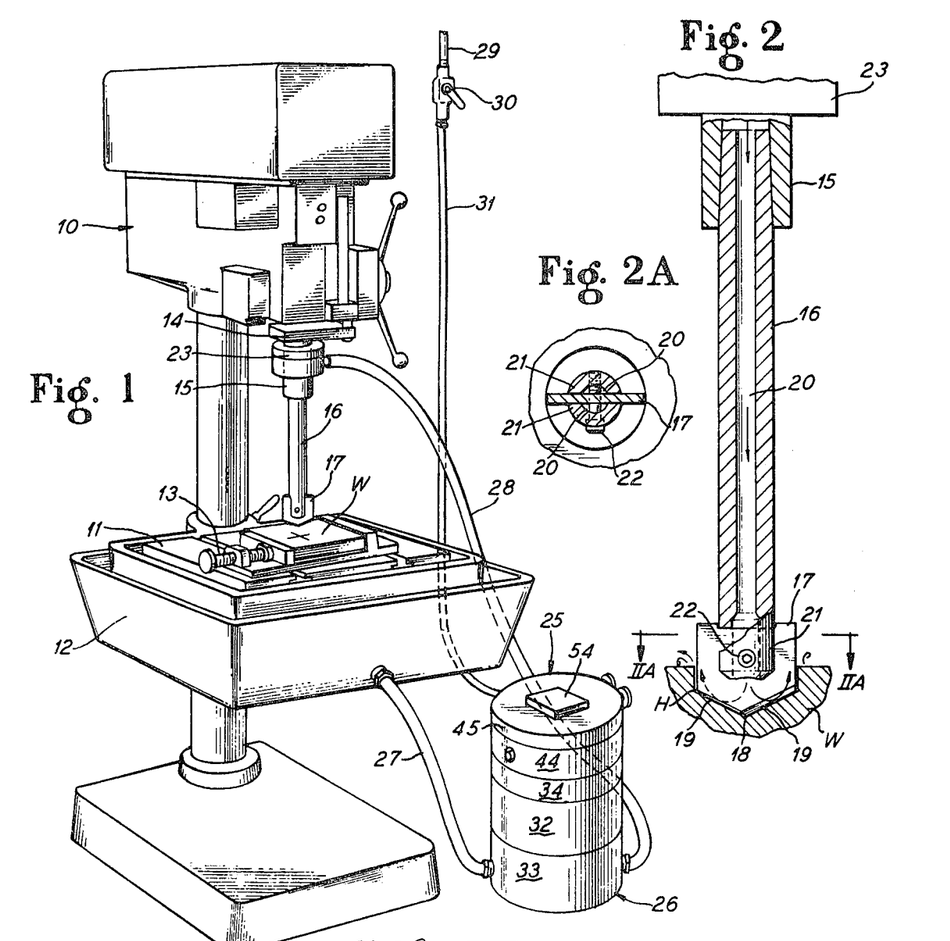
FIG. 1 is a perspective view of a machine tool with a spade drill and a coolant system of this invention.
FIG. 2 is a fragmentary longitudinal sectional view, with parts in side elevation, of the spade drill of the machine tool of FIG. 1.
FIG. 2A is a transverse sectional view, along the line 2A—2A of FIG. 2.

The machine tool of FIG. 1 is a conventional drill press 10 having a work support table 11 surrounded by a coolant collecting sump 12 and carrying a workpiece W in a suitable clamp 13. The drill press 10 has a vertically movable head 14 from which depends a driven spindle 15 mounting the hollow stem 16 of a spade drill head 17. The spade drill head 17 has a tip end 18 with diverging cutting edges 19, 19 radiating from the tip. As better shown in FIG. 2, the stem 16 is hollow and has a passage 20 therethrough communicating at the top thereof with the hollow interior of the spindle 15. The bottom end of the stem is bifurcated at 21 and the spade drill head 17 fits in the slot between the bifurcations. A bolt 22 extends through the bifurcations and the spade drill head and clamps the same fixedly to the bottom of the stem. The passage 20 opens through the bottom of the stem and is bisected by the head 17 in the bifurcated bottom end of the stem. Coolant pressure fed through the passage will cascade over the sides of the head 17 and into the hole H being drilled in the workpiece W.

A rotary coupling or gland 23 on the spindle 15 feeds coolant to the passage 20 of the stem 16.

The coolant system 25 of this invention includes an upright container 26 which is conveniently mounted on the floor adjacent the drill press 10 receiving coolant from the sump 12 through a hose 27 and delivering coolant under pressure to the rotary gland 23 through a hose 28. A compressed air line 29, such as is commonly provided in machine shops, feeds air through a shut-off valve 30 to a hose 31 leading to the top of the container 26 for providing the sole propelling force for the feed of coolant to the tool of the drill press 10.

Figures 4, 5, 6, 18:
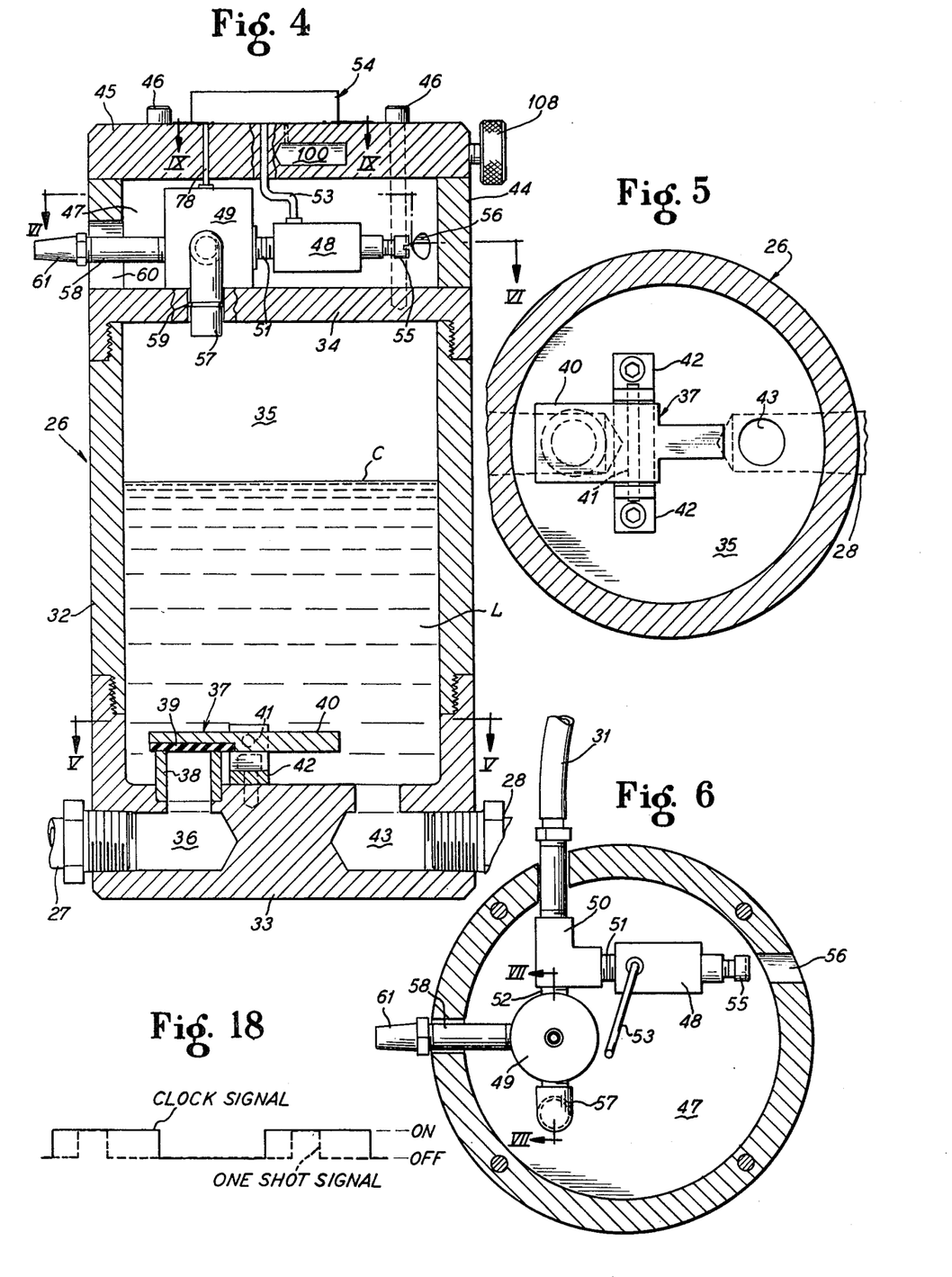
FIG. 4 is a vertical cross sectional view taken along the line IV—IV of FIG. 3.
FIG. 5 is a horizontal cross sectional view taken along the line V—V of FIG. 4.
FIG. 6 is a horizontal cross sectional view taken along the line VI—VI of FIG. 4.
FIG. 18 is a diagrammatic illustration of the frequency and duration of cycles produced by the frequency regulator and the duration control devices.

The container 26, as best shown in FIG. 4, has a tubular upright body portion 32 with a bottom cap 33 threaded onto the bottom end thereof and a top cap 34 threaded onto the top end thereof. A chamber 35 is thus provided receiving a column C of liquid coolant and lubricant L. The liquid L is supplied from the sump 12 through the hose 27 to an inlet 36 in the bottom cap 33 which discharges into the chamber 35 under control of a flap valve 37. The valve 37 includes an upstanding tube 38 extending from the inlet 37 into the chamber 35. The open top of the tube 38 is covered by a resilient lid 39 carried on the underface of a tiltably mounted plate 40 which is pivoted on a pin 41 supported by brackets 42 which are bolted to the bottom cap 33 as also shown in FIG. 5. The flap 40 is counterbalanced to admit the liquid coolant L to the chamber 35 when the pressure of head of the liquid in the inlet 36 is above the pressure or head of the liquid in the chamber 35 and to press the lid 39 tightly against the top of the tube 38 when the pressure or head of the liquid L in the chamber 35 is above the inlet pressure or head.

The bottom cap 33 also has an outlet port 43 discharging to the hose 28 for supplying liquid coolant under pressure through the rotary gland 23 to the stem 16 of the spade drill.

The top cap 34 supports an upstanding collar 44 on which is mounted a thick cover 45. Bolts 46 extending through the cover 45 and threaded into the top cap 34 secure the cover and collar to the top cap 34. A chamber 47 is thus provided above the top cap 34. A pressure regulating valve 48 and a three-way control valve 49 are mounted in this chamber 47.

Figure 3:
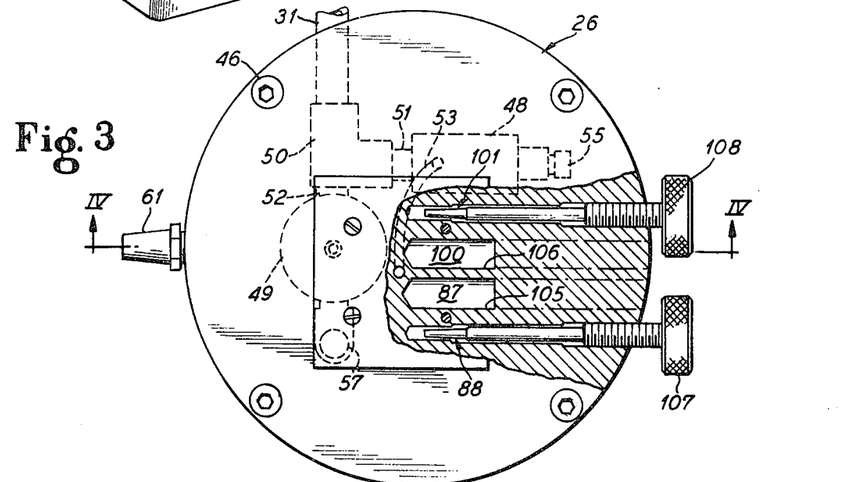
FIG. 3 is a top plan view of the coolant system unit of this invention, with a portion broken away and shown in horizontal section to illustrate the needle valve controls.

As shown in FIGS. 3 and 6, the compressed air hose 31 is coupled to a fitting 50 in the chamber 47, with one leg of the fitting supplying air to the inlet of the pressure reducing valve 48 at 51 and the other leg of the fitting supplying air to the inlet of the three-way valve 49 at 52. The reducing valve 48 has an outlet tube 53 delivering air under reduced pressure to a fluidics control unit 54 mounted on the cover 45 as shown in FIG. 4. The air pressure in the tube 53 is selected by a manual screw control 55 on the pressure regulating valve 48 and the collar 44 has an opening 56 aligned with the screw control 55 for easy access to the screw control.

The three-way valve 49, receiving compressed air from the inlet 52, selectively joins the inlet with a first outlet 57 communicating with the top of the chamber 35 and a second outlet 58 communicating with the atmosphere. An outlet tube for the outlet 57 extends through a hole in the top cap 34 and is sealed to the cap by a seal ring 59 so that the air pressure is confined to the chamber 35. An outlet tube from the outlet 58 extends freely through an opening 60 in the collar 44 and preferably has a muffling nozzle 61 outside of the collar for silencing and directing exhaust air from the top of the chamber 35.

Figure 7:
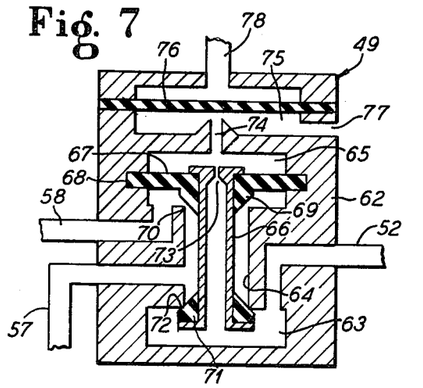
FIG. 7 is a somewhat diagrammatic vertical sectional view taken along the line VII—VII of FIG. 6 and showing the valve in an atmospheric venting position.
Figure 8:
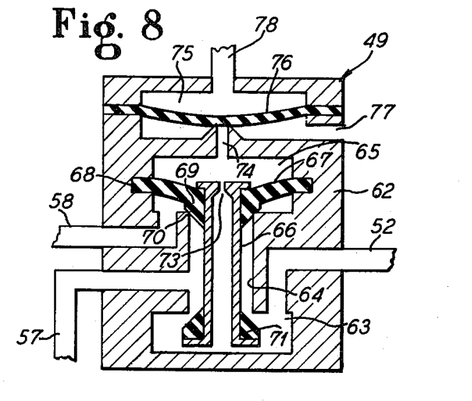
FIG. 8 is a view similar to FIG. 7 but showing the valve in compressed air charging position.

As shown in FIGS. 7 and 8, the valve 49 is somewhat diagrammatically illustrated as having a housing 62 with a bottom chamber 63 receiving compressed air from the inlet 52. The chamber 63 communicates with a bore 64 extending to a top chamber 65. A hollow spool 66 extends freely through the bore 64 and is suspended from a flexible diaphragm 67 spanning the chamber 65 and anchored around its periphery in a groove 68 surrounding the chamber 65. A valve head 69 on the spool 66 cooperates with a seat 70 at the top of the bore 64. A similar valve head 71 on the bottom of the spool 66 cooperates with a valve seat 72 at the bottom of the bore 64. The top end of the spool has a bleeder orifice 73 joining the interior of the spool with the portion of the chamber 65 above the diaphragm 67. This top portion of the chamber 65 is vented through an orifice 74 discharging in a chamber 75 under a diaphragm 76 spanning the chamber. The portion of the chamber 75 under the diaphragm 76 is vented to atmosphere at 77 while the portion of the chamber 75 above the diaphragm is vented to a tube 78 to the fluidics control device 54 as will be explained hereinafter in greater detail.

In the position of FIG. 7, in which the chamber 75 above the diaphragm 76, is at atmospheric pressure, compressed air entering the bottom chamber 63 of the valve 49, from the inlet 52, acts against the bottom of the hollow spool 66 to urge the valve head 71 against the seat 72. A small flow of air from the chamber 63 is allowed to vent through the bleeder hole 73 and orifice 74 under the diaphragm 76 for discharge through the outlet 77. In this portion, the bottom of the bore 64 is closed by the valve head 71 but the top of the bore is open since the valve head 69 is off of its seat 70. Air from the top of the chamber 35 is thus vented through the passage 57, through the bore 64 to the top chamber 65 under the diaphragm 67 and released to the atmosphere through the passage 58. Under these conditions, therefore, the chamber 35 will be under atmospheric pressure and only a small amount of compressed air is bled through the bleeder hole 73 to the atmosphere at 77.

In the position of FIG. 8, an air pressure signal from the fluidics control device 54 through the tube 78 and into the top of chamber 75, depresses the diaphragm 76 to close the orifice 74 and air bleeding through the bleeder hole 73 will build up air pressure in the top of the chamber 65 depressing the diaphragm 67 thereby shifting the spool 66 to unseat the valve head 71 and to seat the valve head 69 whereupon air will flow from the inlet 52 into the bore 64 and out through the passage 57 to subject the chamber 35 to the full air line pressure from the hose 31. At the same time, the exhaust passageway 58 is sealed by the valve head 69. The valve will remain in the position of FIG. 8 as long as the air pressure signal above the diaphragm 76 remains "high" from the control unit 54 for deflecting the diaphragm 76 into sealing engagement against the orifice 74.

The valve 49 is, therefore, effective to selectively subject the column of liquid C in the chamber 35 to the full air line pressure from the air line supply source, to shut off the air line pressure feed to the chamber and to exhaust the top of the chamber to atmosphere, all in response to air pressure signals generated by the fluidics control unit 54.

The fluidics control unit 54 comprises a low pressure pneumatic diaphragm logic control device in which switching is provided by a simple function of pressure and area which produces a positive mechanical action at high speeds and with no added power input requirements.

Figures 15, 16, 17:
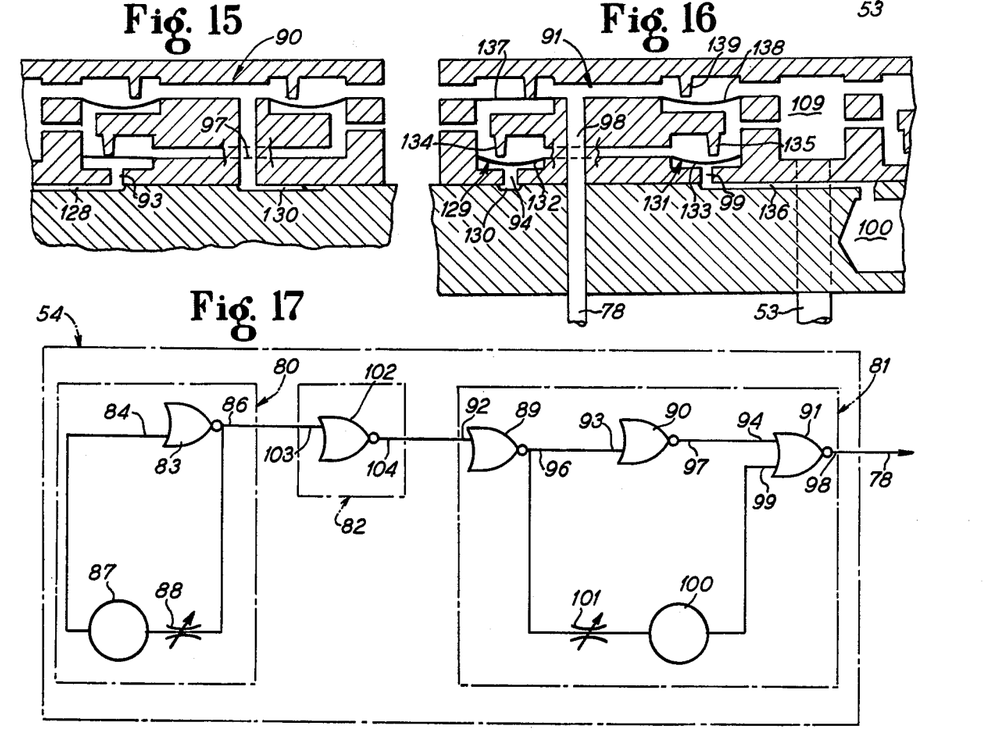
FIG. 17 is a fluidics logic schematic diagram of the clock or frequency control, the buffer, and the duration control devices.

As best seen in the schematic diagram of FIG. 17, the control unit 54 includes a "clock" or frequency controlling adjustable fluidics oscillator portion 80 and a "one shot vibratory" or duration controlling adjustable fluidics oscillator portion 81. The oscillator portion 81 provides a selected duration of the output control signal for the operation of the three-way valve 49, within the selected frequency of the clock cycle. These two adjustable oscillator protions 80 and 81 provide for the intermittent feed of the liquid coolant and lubricant L to the drill head 17 at most any usable frequency and at suitable durations as may be required. A buffer portion 82 is interposed between the clock 80 and the one shot vibrator 81 to insure proper operation of the clock oscillator 80. The clock oscillator 80 includes a NOR-gate 83 having an input at 84 and an output at 86 with a capacitor 87 and adjustable resistor 88 connected in series between the output 86 and the input 84. The one shot vibrator portion 81 comprises NOR-gates 89, 90 and 91 having inputs at 92, 93 and 94 and outputs at 96, 97 and 98, respectively. NOR-gate 91 is provided with a second input 99 having a capacitor 100 and an adjustable resistor 101 connected in series between the output 96 of the gate 89 and the second input 99 of the gate 91. The buffer portion of the control unit 54 comprises a NOR-gate 102 having an input at 103 and an output at 104. Power supply to the NOR-gates is not shown.

Figure 9:
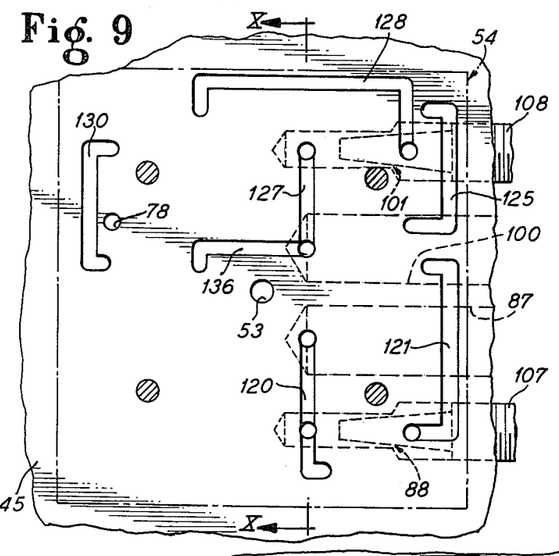
FIG. 9 is a horizontal sectional view along the line IX—IX of FIG. 4 showing passages in the top face of the container and the underlying needle valves.
Figure 10:
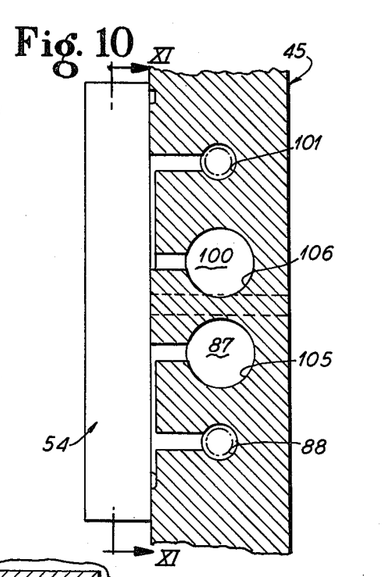
FIG. 10 is a transverse sectional view along the line X—X of FIG. 9.

With specific reference to FIGS. 3, 9 and 10 of the drawings, capacitor 87 and capacitor 100 consists of enclosed pressurizing chambers 105 and 106 formed in the cover 45 with the adjustable resistors 88 and 101 similarly produced, but having needle valves 107 and 108 threaded therein to vary the flow rates between the output and input of the gate 83 via the capacitor 87, and between the output of the gate 89 and the input of the gate 91 via the capacitor 100.

Figure 11:
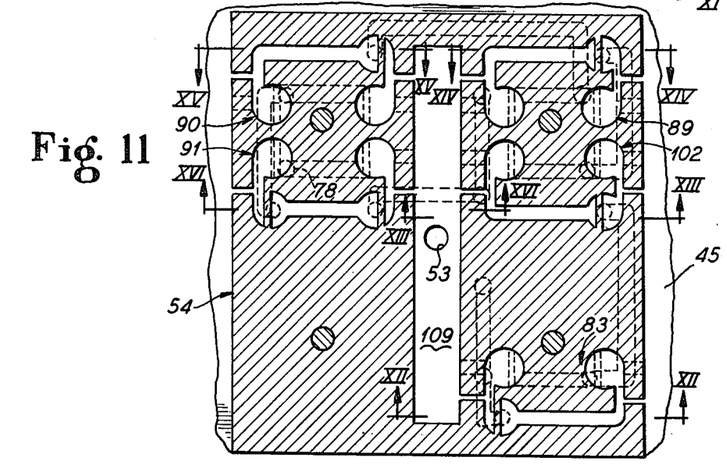
FIG. 11 is a view along the line XI—XI of FIG. 10.
Figure 12A:
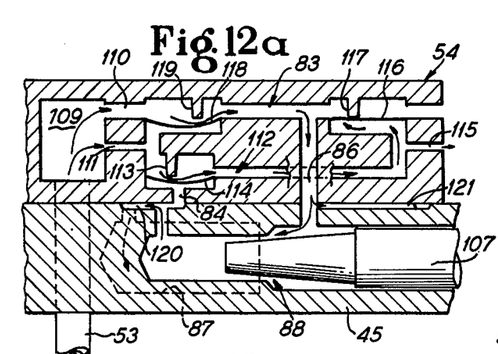
FIGS. 12a and 12b are cross sectional views along the line XII—XII of FIG. 11 showing the alternate flow passages for the clock or frequency control apparatus.

As best seen in FIG. 11 and 12A, reduced air pressure, supplied to the fluidics control unit 54 by way of the tube 53, enters an elongated power supply chamber 109 enclosed within the unit and is effective to individually power each of the NOR-gates 83, 89, 90, 91 and 102 by means of suitable fluid connections. In operation chamber 109 feeds air pressure to NOR-gate 83 by way of a power supply port 110 with a resistor port 111 feeding a control section 112 from the chamber 109.

Figure 12B:
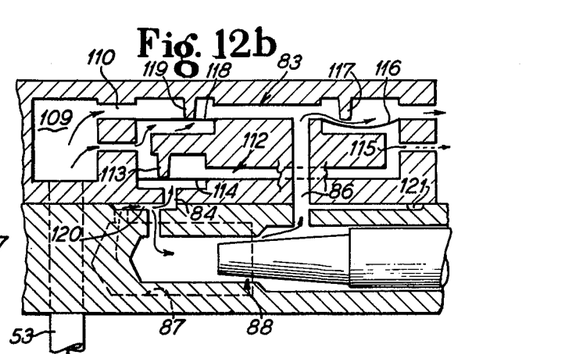
Figure 13:
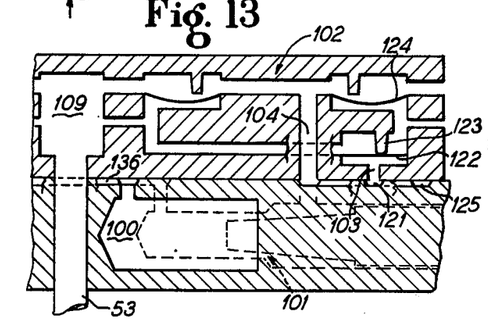
FIG. 13 is a cross sectional view along the line XIII—XIII of FIG. 11 showing a dampener or buffer portion of control circuit.
Figure 14:
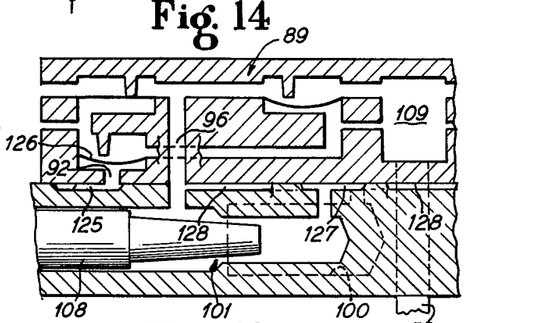
FIGS. 14, 15 and 16 are sectional views along the line XIV—XIV; XV—XV; and XVI—XVI of FIG. 11 diagrammatically illustrating the flow passages of the duration control system.

The air flow through the control section 112 after entering the resistor port 111 passes between a control ridge 113 and an open control diaphragm 114 and vents to atmosphere through a second and equal sized resistor port 115. Because the two resistor ports 111 and 115 are equal in size the pressure between them is only one half the supply pressure to the port 110. This reduced control pressure is high enough to close a vent diaphragm 116 against a vent ridge 117 of the gate 83 but is not sufficiently high to close the output diaphragm 118 against its ridge 119, since the applied pressure on the upper surface of the diaphragm 118 exceeds the reduced pressure force acting on its lower surface while the pressure force applicable against the much smaller upper exposed area of the vent diaphragm 116 is less than the control pressure force applicable against the entire lower surface of the diaphragm 116. The resultant forces maintain the output diaphragm 118 open while holding the vent diaphragm 116 closed when the capacitor 87 is below switching pressure, as shown in FIG. 12A. Herein, an output pressure signal is directed to the output passage 86 of the NOR-gate 83 and flow begins to pressurize capacitor 87 through the flow regulating resistor 88 by way of a passage 120. At the same time that capacitor 87 is filling output, flow is directed to the buffer NOR-gate 102 (FIG. 13) by way of a passage 121. NOR--gate 102 is similar in operation and construction to the NOR-gate 83 and also receives its pressure power supply from the power supply chamber 109. Passages 120, and 121 are formed by machining a shallow groove in the top surface of the cover 45. Once pressure has built up to a switching level of NOR-gate 102, input control diaphragm 122 closes against its control ridge 123 thereby blocking pressure to the under side of the gate's vent diaphragm 124 permitting the output of NOR-gate 102 to vent to atmosphere, and turning off the gate. (See FIG. 13) At this time, capacitor 87 is filling through the resistor 88 and pressure gradually rises to a switching level at variable times depending on the adjustment of the needle valve 107. At switching pressure NOR-gate 83 turns off (See FIG. 12B) and capacitor 87 gradually discharges through the resistor 88 to atmosphere since input diaphragm 114 is now closed against its control ridge 113, allowing the control pressure below vent diaphragm 116 to bleed to atmosphere, to open the vent diaphragm. Further, the resultant force at this time is capable of closing the output diaphragm 118. After pressure decays to a low switching pressure, NOR-gate 83 again turns on (FIG. 12A) and NOR-gate 102 turns off and the cycle repeats. Thus, a variable frequency, symetrical square wave pressure output (clock) signal is provided in output passage 125 by the action of the NOR-gates 83 and 102. (See FIG. 18).

Thus, it will be seen, when the NOR-gate 83 turns on NOR-gate 102 turns off. With no output signal delivered to the NOR-gate 89 via the passage 125, its control diaphragm 126 will remain open and the NOR-gate 89 will turn on, in the manner described for the operation of NOR-gate 83 (FIG. 12A). The output passage 125 is also formed in top surface of the cover 45 similar to the passages 120 and 121.

NOR-gate 89 is similar in operation and construction to NOR-gates 83 also, having a capacitor 100 and resistor 101 similar to the capacitor 87 and resistor 88, connected to the output 96 by means of a passage 127 and also connected to the input control 93 of NOR-gate 90 by means of a grooved passage 128, machined in the top surface of cover 45 (See FIG. 9).

When NOR-gate 102 goes on and begins to pressurize the capacitor 100 through the flow regulating resistor 101, a pressure signal directed to the input control 93, will turn off NOR-gate 90 in the mode of operations described for NOR-gate 102. With NOR-gate 90 off, input 94 to NOR-gate 91 will be at atmospheric pressure and the gate will turn on (FIG. 16). The output 97 from NOR-gate 90 is connected to the input 94 of a control section 129 of the gate 91 by means of a grooved passage 130 (See FIG. 9).

NOR-gate 91 is similar to the other NOR-gates but its provided with a pair of control sections 129 and 131, each having control diaphragms 132, 133 and control ridges 134, 135 respectively. Each of the control sections being responsive to a signal directed thereto through one of the inputs 94 and 99. The input 99 is connected to the capacitor 100 by means of a grooved passage 136, machined in the cover 45 (See FIG. 9).

When NOR-gate 102 goes on and its output begins to pressurize capacitor 100 through the adjustable resistor 101, (needle valve 108) a pressure signal to input control 93 will turn off NOR-gate 90. With NOR-gate 90 off, input 94 will be at atmospheric pressure and while the capacitor 100 pressure remains below switching levels, control pressure will turn on NOR-gate 91, in a manner similar to the NOR-gate 83 (FIG. 12A). The gate 91 will then provide an output pressure signal at 98 and on to the three-way valve 49 by way of the tube 78 to actuate the valve as shown in FIG. 8, to charge the top of the fluid column C in the container 26.

At the time NOR-gate 91 turns on, flow passed by the adjustable needle valve 108 gradually fills capacitor 100. When pressure rises in the capacitor 100 to the switching level of NOR-gate 91, the control diaphragm 133 closes against the ridge 135 to block flow to the lower surface of a vent diaphragm 137 and accordingly, permits the diaphragm to open to the turn off the output of NOR-gate 91. Further, a pressure buildup on the under side of an output diaphragm 138, block flow passed an output ride 139 of the gate 91. Herein, the air pressure signal to the three-way valve 49 goes to atmospheric pressure which turns off the valve (FIG. 7 position) and accordingly, vents the top of the column of liquid C in the container 26 to atmosphere.

The three-way control valve 49 remains off throughout the balance of the on cycle of the NOR-gate 83 (clock). Then when the NOR-gate 83 goes off, the buffer NOR-gate 102 goes on and the NOR-gate 89 goes off. This places the inputs at 93 and at the resistor 101 (output 96) at atmosphere pressure. Flow, therefore, is bled from the capacitor 100, through the resistor 101 to atmosphere by way of the output 104 of the NOR-gate 102. As pressure decays in capacitor 100 to switching level, NOR-gate 91 would normally go on; however, at the same time that the output of NOR-gate 102 is vented to atmosphere, NOR-gate 90 turns on sending a control signal to the control section 129 of NOR-gate 91 permitting the vent diaphragm 137 to open to keep NOR-gate 91 off and accordingly, the three-way valve 49.

The one shot vibrator portion 81 of the fluidics control unit 54, therefore, must wait for the next positive signal from the clock NOR-gate 83 before starting another cycle to activate the three-way valve 49.

Thus, the one shot vibrator portion 81 provides a desired duration for the air pressure signal to the three-way valve which may be adjusted to any portion of the selected frequency as provided by the clock NOR-gate 83. (See FIG. 18).

Obviously, the operating cycle of the three-way valve 49 will be determined by the combined adjustable output signals of the clock or frequency controlling oscillator portion 80 and the one shot or duration controlling oscillator portion 81 of the fluidics control unit 54.

From the above descriptions, it will, therefore, be understood that this invention provides an air propelled liquid coolant and lubricating system for machine tools where the liquid is pressure fed over the working area of the tool and against the workpiece to flush out chips at intermittent intervals and for durations selectively controlled for optimum conditions. The system of this invention is activated entirely by air pressures such as is supplied from the conventional air line of a machine shop and is controlled by a fluidics system that is manually adjusted with two simple needle valves. The liquid is continuously reused, flowing from the machine tool to from a column in a container which supplies air under pressure to the top of the column at a frequency and for a duration controlled by the needle valves. The air is not admixed with the liquid so that a fully liquid flow to the machine tool is provided.

I claim as may invention
1. A liquid coolant and lubricant system for machine tools which comprises a container receiving liquid coolant and lubricant from the machine tool to form a column of liquid in the container, an outlet for feeding liquid from the column to the machine tool, and means for introducing air under pressure to the top of the column and for releasing air pressure from the container at a selected frequency and for a selected duration to intermittently feed the liquid coolant and lubricant under pressure to the machine tool and workpiece.

2. A device for intermittently feeding liquid coolant to a machine tool which comprises a container having a chamber for a column of liquid coolant, a bottom inlet for receiving coolant from the machine tool, a bottom outlet for delivering liquid coolant to the machine tool, means for selectively introducing air under pressure to the top of the container and venting the top of the container to the atmosphere, and a fluidics control for said means effective to select the frequency of intermittent coolant feed to the machine tool and the length of feed duration within the selected frequency.

3. A timed intermittent air propelled liquid cooling system for machine tools which comprises an upright container for housing a column of liquid coolant, a bottom inlet in said container for feeding coolant from a machine tool to the bottom of the container, a check valve controlling said inlet to prevent back flow from the container, a bottom outlet in said container for delivering liquid coolant from the bottom of the column of liquid in the container to a machine tool, an air valve for selectively admitting air pressure to the top of the container over the column of coolant therein and for venting the interior of the container to the atmosphere, and means for automatically shifting said valve to intermittently pressurize the column of coolant in the container at a selected frequency and to vent the container to the atmosphere after a selected duration of air pressure in the container.

4. The method of cooling the tool of a machine tool and the workpiece engaged by the tool which comprises forming a column of liquid coolant, intermittently air pressure loading and venting to the atmosphere the top of said column of liquid coolant at selected frequencies and for selected durations, feeding coolant from said column to the tool of the machine tool, discharging liquid coolant under pressure at the tip of the tool against the workpiece, and recirculating coolant from the machine tool to said column when the column is under atmospheric pressure.

5. The method of drilling a hole in a workpiece with a hollow stem drill which comprises forming a column of liquid coolant, pressure feeding liquid coolant from the bottom of said column through the stem of the drill over the drill tip and against the workpiece, circulating coolant from the machine tool to the bottom of said column, and alternatively applying air under pressure to the top of the column and venting the column to lower pressure at a selected frequency and for a selected duration to intermittently pressure feed the liquid coolant to the drill and workpiece.

6. The system of claim 1 including a fluidics device operated by air pressure to control the means for introducing air under pressure to the top of the column and for releasing air pressure from the container.

7. The system of claim 2 wherein the fluidics device has an oscillator portion controlling frequency and a vibratory portion for controlling duration within the frequency.

8. The system of claim 1 including a pair of manually adjusted needle valves controlling said means for introducing air under pressure to the top of the column and for releasing air pressure from the container to vary the frequency and the duration of coolant and lubricant feed to the machine tool and workpiece.

9. The system of claim 1 wherein a three-way valve introduces air to the top of the column and releases air from the container and a fluidics control device shifts said valve to vary the frequency and the duration of coolant feed.

10. The system of claim 1 including a machine shop air pressure line to supply air to said means and an air actuated fluidics control device to regulate said means.

11. The device of claim 2 wherein the means for selectively introducing air under pressure to the top of the container and bending the top of the container to the atmosphere is a three-way valve shifted by said fluidics control.

12. The device of claim 2 wherein the fluidics control is actuated by air from the means for introducing air.

13. The device of claim 2 wherein the container has hose connections with the machine tool and with a machine shop air source.

14. The device of claim 2 wherein the fluidics control includes a clock and a one shot vibrator.

15. The system of claim 3 wherein the air valve has a hollow spool with valve heads at opposite ends cooperating with seats and a diaphragm controls the shifting of the spool valve.

16. The system of claim 2 wherein the outlet in the container communicates directly through a hose with the hollow stem of a drill in said machine tool.

17. The system of claim 3 wherein the machine tool is a spade drill press having a hollow spindle, a rotary coupling and a hose attached to said coupling joins the bottom outlet of the container with the interior of the spindle.

18. The system of claim 2 wherein the machine tool has a hollow stem spade drill with the stem receiving coolant from the column in the container and discharges the coolant over the side faces of the spade drill head into the hole being drilled.

19. The method of claim 4 including the step of flowing the liquid coolant through a hollow drill stem to a spade drill head mounted on the stem for cascading coolant over the drill head into the hole being drilled in the workpiece.

20. The method of claim 4 including the step of feeding the coolant from the bottom of said column to the tool of the machine tool.

21. The method of claim 4 including the step of recirculating the coolant from the machine tool to the bottom of said column.

22. The method of claim 4 including the step of using air pressure to control the frequencies and the durations of a coolant feed.

23. The method of claim 4 including the added step of pressure feeding the coolant through the hollow stem of a tool against the workpiece.

24. The method of claim 4 including the step of feeding the coolant through the hollow stem of a spade drill and discharging the coolant under pressure from said stem over the sides of the spade drill tip against the workpiece in the hole being drilled.

25. The method of claim 5 including the step of preventing back flow of coolant from the bottom of said column to the machine tool.

26. The method of claim 5 including the use of air pressure to control the feeding of air to the top of the column and the venting of the air from said top of the column.

* * * * *

UNITED STATES PATENT AND TRADEMARK OFFICE
CERTIFICATE OF CORRECTION

PATENT NO. : 4,095,916
DATED : June 20, 1978
INVENTOR(S) : Earl J. Hammond

It is certified that error appears in the above—identified patent and that said Letters Patent are hereby corrected as shown below:

Column 1, line 24, cancel "art" and insert --air--;
Column 4, line 11, cancel "of" and insert --or--;
Column 5, line 15, cancel "portion" and insert --position--;

Column 7, line 43, cancel "its" and insert --is--;
Column 8, line 1, before "turn" cancel "the"; and
Column 9, line 33, cancel "colunn" and insert --column--.

Signed and Sealed this

Twenty-fifth Day of September 1979

[SEAL]

Attest:

LUTRELLE F. PARKER
Attesting Officer    Acting Commissioner of Patents and Trademarks